3,268,386
BONDING TEXTILE MATERIALS TO MONO-OLEFINE RUBBERS
Alan Paul Osborne, Wood End, near Atherstone, England, assignor to Dunlop Rubber Company Limited, London, England, a British company
No Drawing. Filed Apr. 10, 1964, Ser. No. 358,935
Claims priority, application Great Britain, Apr. 23, 1963, 15,874/63
The portion of the term of the patent subsequent to Jan. 11, 1983, has been disclaimed
21 Claims. (Cl. 161—248)

This invention relates to the bonding of textile materials to mono-olefine rubbers.

In the copending Doyle U.S. application Serial No. 63,949, filed October 21, 1960, now U.S. Patent No. 3,228,824 and owned by the assignee of the present application, there is described and claimed an adhesive composition suitable for bonding textile materials to rubber, the adhesive composition comprising an admixture in aqueous dispersion of an incompletely condensed phenolic resin and a copolymer of a conjugated diene and an unsaturated ketone, the said copolymer containing from 0.2 percent to 10 percent by weight of the unsaturated ketone.

It has now been found that the adhesive compositions of the aforesaid Doyle U.S. application are of especial value for the bonding of textiles to mono-olefine rubbers.

According to the present invention a method of bonding a textile material to a curable mono-olefine rubber composition comprises treating the textile material with an admixture in aqueous dispersion of an incompletely condensed phenolic resin and a copolymer of a conjugated diene monomer and an unsaturated ketone, the said copolymer containing from 0.2 percent to 10 percent by weight of the unsaturated ketone, drying the treated textile material, coating the said textile with the curable mono-olefine rubber composition, and heating the assembly to cure the rubber composition.

The preferred copolymers contain from 0.5 percent to 5 percent by weight of the unsaturated ketone.

The unsaturated ketone of the copolymer is preferably an aliphatic ketone. Suitable ketones are any of the straight or branched chain unsaturated alkyl ketones such as methyl vinyl ketone, methyl isopropenyl ketone, ethyl vinyl ketone, ethyl isopropenyl ketone, propyl vinyl ketone and isopropyl isopropenyl ketone. Although higher alkyl ketones may be employed, there should preferably be not more than 4 carbon atoms in the alkyl group.

The conjugated diene can be any of the butadiene-1,3 hydrocarbons such as butadiene-1,3 itself, 2-methylbutadiene-1,3 (isoprene), 2,3-dimethyl butadiene-1,4 piperylene, 1-phenyl butadiene-1,3,2-phenyl butadiene-1,3,2-neopentyl butadiene-1,3, or other hydrocarbon homologues of butadiene-1,3. Any of the straight chain conjugated dienes or the straight and branched chain hexadienes can be used but the butadiene-1,3 hydocarbons are preferred.

A preferred incompletely condensed phenolic resin is one which is soluble in water or in dilute alkaline solution. An alkali-soluble resorcinol/formaldehyde resin is especially suitable in the practice of this invention.

Suitable adhesive compositions have phenolic resin to copolymer ratios which can be varied over quite considerable limits, for example from 1:9 to 9:1.

The copolymer of the conjugated diene and the unsaturated ketone is preferably prepared by means of emulsion polymerization in an aqueous medium.

The aqueous dispersion of the copolymer can be prepared at an elevated temperature in the presence of a suitable catalyst such as a soluble persulphate, or preparation can take place at a reduced temperature for which a Redox catalyst system is preferred.

The adhesive composition is preferably prepared by mixing together an aqueous dispersion of the copolymer with an aqueous dispersion of the phenolic resin.

An aqueous dispersion of resorcinol/formaldehdye resin, suitable for use in the preparation of the adhesive, can be prepared by dissolving resorcinol in water and adding formaldehyde. The copolymer dispersion, to which there has been added a small amount of a resorcinol/formaldehyde polymerization catalyst such as a dilute caustic soda solution, and the resorcinol/formaldehyde dispersion are then admixed in the proportions desired. Preferably, the mixture is then matured for a period of from 12 to 24 hours prior to its use as an adhesive. Mixed dispersions suitable for the practice of this invention usually have a total solids content of from 5 percent to 30 percent but preferably from 10 percent to 20 percent.

By the term "mono-olefine rubbers" in this specification there are included rubber polymers and copolymers of at least one alpha-mono-olefine and also interpolymers of at least two alpha-mono-olefines with at least one additional compound serving to confer unsaturation on the uncured interpolymer.

The additional copolymerizable compound which confers unsaturation on the interpolymer can comprise up to 15 mole percent or more, but preferably from 0.5 to 5 mole percent, of the interpolymer.

The alpha-mono-olefines of the copolymers and the interpolymers can be selected from ethylene, propylene, butylene and higher homologues but generally alpha-mono-olefines containing from 2 to 4 carbon atoms are preferred with the additional preference that ethylene should be one of the alpha-mono-olefines. Elastomers of particular value are those obtained with ethylene and propylene as the alpha-mono-olefines, especially when the ethylene component provides from 40 to 60 mole percent of the olefine content; the ethylene content can, however, be as high as about 80 mole percent. Other combinations of alpha-mono-olefines which can be employed in the present invention include ethylene and butene-1, ethylene and pentene-1, ethylene and heptene-1 and ethylene and octene-1.

The compound which confers unsaturation on the interpolymer, that is which gives rise to a polymer unit containing at least one double bond, can be for example an open-chain diolefine compound or an acetylene or a cyclic diene monomer, including a bridged-ring hydrocarbon which contains at least two double bonds. Examples of suitable compounds are conjugated and unconjugated dienes such as butadienes, isoprene, piperylene, dimethylbutadiene, hexadienes, and higher homologues; cyclic dienes such as cyclopentadiene and its derivatives are also suitable. Particularly suitable compounds of the bridged-ring type are described in British Patent No. 880,904.

The mono-olefine rubbers can be cured by means of organic peresters or peroxides, dicumyl peroxide being the preferred peroxide, with or without the addition of a small amount of sulphur. The interpolymers containing unsaturated groups, however, can if desired be cured by means of sulphur and the usual rubber activators and accelerators. The mono-olefine rubbers can contain reinforcing agents, such as carbon black, and also plasticisers, antioxidants and fillers.

In the preferred method of bonding textile material to a mono-olefine rubber the textile is treated with the adhesive composition and allowed to dry, preferably at a temperature between 100° C. and 220° C. The treated textile is then coated with a curable mono-olefine rubber composition and the rubber cured by heating the resulting assembly at an appropriate temperature and for a suitable time.

Natural and synthetic textile materials can be bonded to mono-olefine rubbers in accordance with the present invention. The invention is of especial value for bonding fibres of polyamides e.g. nylon, and polyesters, for example, polyethylene glycol terephthalate.

It has been found that adhesion of rubbers to polyesters, such as polyethylene glycol terephthalate, is considerably improved when the fibres are given an initial treatment with a composition comprising polyvinyl chloride and a cross-linking agent such as triallyl cyanurate or a polyamide resin, with an isocyanate, with a polyethylene imine or with hexamethylene diethylene urea before treatment with a latex/resorcinol/formaldehyde adhesive. For adhesion of the initially-treated polyester fibres to curable mono-olefine rubber compositions the adhesives of this invention show improved results over butadiene/styrene/pyridine/terpolymer latex/resorcinol/formaldehyde adhesives.

Rayon, cotton and other fibres can also be bonded to mono-olefine rubbers by the method of this invention and bonds of outstanding strength are obtained as compared with other known rubber/textile adhesives such as natural rubber latices, butyl rubber latices, butadiene/styrene latices and even butadiene/styrene/pyridine terpolymer latices, when the latices are admixed with phenol/formaldehyde solutions.

The costs of materials and productions of the diene monomer unsaturated ketone copolymers of the invention, such as butadiene/methyl isopropenyl ketone, are considerably lower than those of other adhesives, such as butadiene/styrene/vinyl pyridine terpolymers.

An additional advantage of the diene monomer unsaturated ketone copolymers of this invention is that they are flexible at lower temperatures than the butadiene/styrene/vinyl pyridine copolymers. The stiffening temperatures of a number of the copolymers used were determined from their change in rigidity modulus as the temperature was progressively lowered. The rigidity modulus was measured by means of a torsion test and the stiffening temperature was that at which the rigidity modulus commenced to increase rapidly after remaining at a relatively constant low value. Whereas a commercially available butadiene/styrene/vinyl pyridine terpolymer under the low temperature torsion test has a stiffening temperature of −45° C. the corresponding stiffening temperature of 97/3 isoprene/methyl isopropenyl ketone is −55° C. and of 97/3 butadiene/methyl isopropenyl ketone and of 97/3 butadiene/methyl vinyl ketone it is lower than −60° C.

The invention is illustrated by the following examples, all parts being parts by weight:

Example I 11 parts of resorcinol were dissolved in 200 parts of water and 16.2 parts of a 37 percent solution of formaldehyde were added to the solution. 6 parts of a 10 percent solution of sodium hydroxide, diluted with 104.8 parts of water, were added to 250 parts of 40 percent butadiene/methyl isopropenyl ketone (97/3) copolymer latex, slowly and with stirring. The adhesive was completed by adding the solution of resorcinol and formaldehyde to the diluted latex. After thorough mixing, the adhesive was matured for 24 hours at 24° C.

The butadiene/methyl isopropenyl ketone/resorcinol/formaldehyde adhesive so prepared is in this specification designated adhesive A and was applied to nylon and rayon cords in the usual way, by drawing the cords through the latex and then drying. The nylon cord was Nylon 66 of 850/2 denier construction and the rayon was a high tenacity type of 1650/2 denier.

For the purpose of direct comparison and to show the outstanding degree of adhesion between textile materials and mono-olefine rubbers obtained with the adhesives of the present invention, four other latex/resorcinol/formaldehyde adhesives B, C, D and E were similarly prepared, based upon other latices or latex mixtures but having the same resorcinol and formaldehyde contents in relation to the rubber content. The adhesives B, C, D and E were matured and applied to the nylon and rayon cords in the same way as with adhesive A. The dry weight compositions of the five adhesives were as follows, each adhesive having a total solids content of 20 percent by weight:

|  | Adhesive |  |  |  |  |
|---|---|---|---|---|---|
|  | A | B | C | D | E |
| B/MIK | 100.0 |  |  |  |  |
| B/S/VP |  | 100.0 | 50.0 |  | 40.0 |
| Butyl |  |  | 50.0 | 100.0 |  |
| B/S |  |  |  |  | 60.0 |
| Resorcinol | 11.0 | 11.0 | 11.0 | 11.0 | 11.0 |
| Formaldehyde | 6.0 | 6.0 | 6.0 | 6.0 | 6.0 |
| Sodium hydroxide | 0.6 | 0.3 | 0.3 | 0.3 | 1.2 |

The abbreviations in the above table refer to latices, having a 40 percent polymer content, prepared from polymers as follows:

B/MIK: Butadiene/methyl isopropenyl ketone (97/3)
B/S/VP: Butadiene/styrene/vinyl pyridine (70/15/15)
B/S: Butadiene/styrene (70/30)

The cords were bonded to an ethylene/propylene/diene (55/43/2 mole ratio) terpolymer rubber composition having the following formula:

| Ethylene/propylene/diene (55/43/2 mole ratio) | 100.0 |
|---|---|
| Super-abrasion furnace black | 60.0 |
| Necton 60 oil | 20.0 |
| Quinone dioxime | 1.0 |
| Zinc oxide | 5.0 |
| Tetramethyl thiuram monosulphide | 1.5 |
| Mercaptobenzothiazole | 0.5 |
| Sulphur | 1.5 |

The terpolymer, carbon black, Necton oil and quinone dioxime were mixed together and given a heat treatment in an internal mixer at 180° C. for 10 minutes after which the other compounds were added.

Necton 60 oil is a commercially available saturated aliphatic hydrocarbon type of plasticiser.

The cord/terpolymer rubber assemblies using each of the adhesives A to E on both nylon and rayon cords were given a cure of 20 minutes at 154° C. and the following adhesion figures were obtained:

|  | Adhesion (lb.) |  |  |  |  |
|---|---|---|---|---|---|
|  | A | B | C | D | E |
| Nylon | 14.8 | 10.1 | 8.3 | 10.2 | 12.7 |
| Rayon | 19.4 | 13.5 | 9.4 | 10.7 | 16.2 |

The adhesion figures show clearly that when the cords have been treated with the butadiene/isopropenyl ketone adhesive A according to the invention the bond strength between both nylon and rayon cords and the ethylene/propylene terpolymer composition was much greater than when the other latex/resorcinol/formaldehyde cord adhesives were used.

Example II

Nylon and rayon cords, treated with adhesives A, B and E described in Example I, were bonded to an ethylene/propylene (44/56 mole ratio) copolymer composition having the following formula:

| Ethylene/propylene (44/56 mole ratio) | 100.0 |
|---|---|
| High abrasion furnace black | 50.0 |
| Dicumyl peroxide | 4.0 |
| Sulphur | 0.4 |

The cord/copolymer rubber assemblies were cured for 60 minutes at 150° C. and the following adhesion figures were obtained:

|  | Adhesion (lb.) | | |
| --- | --- | --- | --- |
|  | A | B | E |
| Nylon | 13.2 | 10.4 | 10.2 |
| Rayon | 18.5 | 10.7 | 10.8 |

The butadiene/isopropenyl ketone adhesive A according to the invention gave considerably greater adhesion between the ethylene/propylene copolymer rubber composition and both nylon and rayon cords than that obtained with the other two adhesives.

*Example III*

The same terpolymer rubber as in Example I was used and a composition having the following formula was prepared:

Ethylene/propylene/diene (55/43/2) mole ratio) 100.0
Fast extruding furnace black _____ 40.0
Zinc oxide _____ 5.0
Tetramethyl thiuram monosulphide _____ 1.5
Mercaptobenzothiazole _____ 0.5
Sulphur _____ 1.5

Rayon cords treated with adhesives A, B and E, prepared as described in Example I, were bonded to the terpolymer composition of this example and cured as for Example I, giving the following adhesion figures:

|  | Adhesion (lb.) | | |
| --- | --- | --- | --- |
|  | A | B | E |
| Rayon | 21.4 | 10.0 | 13.1 |

The butadiene/isopropenyl ketone adhesive A gave an adhesion figure between the terpolymer rubber and rayon cord which was of the order of twice the adhesion obtained using the other adhesives.

*Example IV*

The terpolymer used in the mono-olefine composition of this example had a considerably higher ethylene content than the terpolymer of Examples I and III, the composition used having the following formula:

Ethylene/propylene/diene (60/38/2 mole ratio) _ 100.0
High abrasion furnace black _____ 50.0
Circosol 2XH _____ 10.0
Zinc oxide _____ 5.0
Stearic acid _____ 1.0
Tetramethyl thiuram disulphide _____ 1.0
Mercaptobenzothiazole _____ 1.0
Sulphur _____ 1.75

Circosol 2XH is a commercially available highly naphthenic hydrocarbon type of plasticiser.

Nylon and rayon cords treated with adhesives A, B and E, prepared as described in Example I, were bonded in the terpolymer composition of Example IV and cured for 60 minutes at 160° C. The following adhesion figures were obtained:

|  | Adhesion (lb.) | | |
| --- | --- | --- | --- |
|  | A | B | E |
| Nylon | 22.0 | 15.4 | 12.7 |
| Rayon | 21.4 | 14.9 | 19.0 |

The adhesion results obtained show that the butadiene/methyl isopropenyl ketone/resorcinol/formaldehyde latex adhesive according to the invention gave much improved adhesions between textile materials, such as nylon and rayon, and mono-olefine copolymer and terpolymer rubber compositions, than other commonly used latex/resorcinol/formaldehyde adhesives.

Having now described my invention—what I claim is:
1. A method of bonding a textile material to a curable mono-olefine rubber composition which comprises contacting the textile material with an admixture in aqueous dispersion of an incompletely condensed phenolic resin and a copolymer of a conjugated diene monomer and an unsaturated ketone, the said copolymer containing from 0.2 percent to 10 percent by weight of the unsaturated ketone, drying the treated textile material, coating the said textile with the curable mono-olefine rubber composition, and heating the assembly to cure the rubber composition.

2. A method according to claim 1 wherein the said copolymer contains from 0.5 percent to 5 percent by weight of the unsaturated ketone.

3. A method according to claim 1 wherein the ratio of phenolic resin to copolymer is from 1:9 to 9:1.

4. A method according to claim 1 wherein the said conjugated diene monomer is butadiene-1,3.

5. A method according to claim 1 wherein the said unsaturated ketone is an unsaturated alkyl ketone containing not more than four carbon atoms in the alkyl group.

6. A method according to claim 5 wherein the unsaturated alkyl ketone is methyl isopropenyl ketone.

7. A method according to claim 1 wherein the phenolic resin is a resorcinol/formaldehyde resin.

8. A method according to claim 1 wherein the said admixture of aqueous dispersions has a total solids content of from 5 percent to 30 percent.

9. A method according to claim 8 wherein the total solids content is from 10 percent to 20 percent.

10. A method according to claim 1 wherein the mono-olefine rubber is a copolymer of two alpha-mono-olefines.

11. A method according to claim 10 wherein the copolymer is an ethylene propylene copolymer.

12. A method according to claim 1 wherein the mono-olefine rubber is an interpolymer of at least two alpha-mono-olefines together with at least one compound serving to confer unsaturation on the uncured interpolymer.

13. A method according to claim 12 wherein the compound which confers unsaturation is a diene monomer and comprises up to 15 mole percent or more of the interpolymer.

14. A method according to claim 1 wherein the compound which confers unsaturation is a diene monomer and comprises from 0.5 to 5 mole percent of the interpolymer.

15. A method according to claim 1 wherein the alpha-mono-olefines of the mono-olefine rubber contain from 2 to 4 carbon atoms.

16. A method according to claim 1 wherein the mono-olefine rubber contains ethylene in an amount of from 40 to 80 mole percent of the olefine content.

17. A method according to claim 16 wherein the ethylene content is from 40 to 60 mole percent of the total olefine content.

18. A method according to claim 1 wherein the textile material is nylon cord.

19. A method according to claim 1 wherein the textile material is rayon cord.

20. A method of bonding a textile material to a curable mono-olefine rubber composition wherein the bonding agent is an admixture of a phenolic resin and a copolymer of a conjugated diene monomer and an unsaturated ketone.

21. An article comprising textile material bonded to a cured mono-olefine rubber composition, obtained by the method of claim 1.

References Cited by the Examiner

UNITED STATES PATENTS

| | | | |
|---|---|---|---|
| 2,394,375 | 2/1946 | Gross | 260—43 X |
| 2,561,215 | 7/1951 | Mighton | 156—110 |
| 2,669,553 | 2/1954 | Schoffel et al. | 260—1 |
| 2,902,398 | 9/1959 | Schroeder | 117—80 X |

OTHER REFERENCES

Whitby, G. S., Synthetic Rubber; John Wiley and Sons, 1954, New York, pp. 690–695.

EARL M. BERGERT, *Primary Examiner.*

CLIFTON B. COSBY, *Examiner.*